Patented Dec. 31, 1940

2,227,082

UNITED STATES PATENT OFFICE 2,227,082

PHOSPHATE GLASS

Hans Grimm, Heidelberg, and Paul Huppert, deceased, late of Mannheim, Germany, by Julius Knapp, administrator, Mannheim, Germany, assignors, by mesne assignments, to Walter H. Duisberg, New York, N. Y.

No Drawing. Application June 14, 1938, Serial No. 213,722. In Germany June 17, 1937

6 Claims. (Cl. 106—36.1)

The present invention relates to improvements of phosphate glass.

Glass containing large amounts of lead oxide and boric acid is distinguished by a specially low softening temperature. By reason of the ready reducibility of the lead oxide, however, such glass is unsuitable for working in the glass-blowing lamp. Among phosphate glass, that which is readily fusible is usually strongly soluble in water so that there are limits to its technical use.

The object of our present invention is to provide very readily fusible phosphate glass which is of good stability to attack by water and may be very readily worked even in the flame of the Bunsen burner. The obvious step of increasing the content of alkali in order to obtain as low a softening point as possible leads in the case of glass mixtures which contain large amounts of alumina in addition to phosphoric acid and a little boric acid at first to strongly watersoluble glass. Furthermore the introduction of alkaline earth did not at first effect any improvement in the stability to water.

We have found that the suppression of the boric acid present in addition to the said components, less than 12 per cent, with an alumina content of more than 20 per cent leads to glass having a good stability to water even when the total alkali content exceeds 25 per cent and amounts for example to about 28 per cent and there is only phosphoric acid present in addition to the said components. In many cases it has also proved preferable to replace a part of the boric acid by zinc oxide in an amount not exceeding 6 per cent of the glass weight, whereby the softening temperature is still further lowered and the stability to water greatly increased. Marked lowering of the softening temperature is also obtained by introducing up to 3 per cent of lithium oxide as a substitute for part of the other alkalies or also of the boric acid; no appreciable reduction in the stability to water is thus effected. Furthermore it has proved to be essential to use potassium oxide and sodium oxide together as alkalies the total amount of which must in all cases not be less than 25 per cent. The relative proportions of the two may be varied within certain limits, but the following should be borne in mind:—

By enriching the $K_2O$-content too greatly as compared with the $Na_2O$-content, the softening temperature rises considerably and at the same time the water-solubility increases slightly also; in working in the lamp there is an increasing tendency to devitrify which usually leads to marked turbidity in the case of glass which contains as alkali only $K_2O$ in addition to a little $Li_2O$. Conversely, too great an increase in the $Na_2O$-content at the expense of the $K_2O$-content leads to a very great and sudden increase in the water-solubility from a certain limit, while only a slight increase in the softening temperature and only in the case of glass free from $K_2O$ any marked tendency to devitrification is noticeable. It has proved favorable, with a total alkali content of at least 25 per cent, to select a $K_2O$-content between 5 and 21 per cent and a $Na_2O$-content between 8 and 21 per cent, provided the remaining composition of the glass is as follows: from 34 to 44 per cent of $P_2O_5$, from 20 to 30 per cent of $Al_2O_3$, not more than 12 per cent of $B_2O_3$, from 0 to 3 per cent of $Li_2O$, from 0 to 6 per cent of ZnO and from 0 to 5 per cent of BaO.

The softening temperature of the glass lies considerably below 400° C.; it is defined as horizontal tangent to the dilatometer curve. The softening temperatures given in the following examples are determined with a modified Chevenard's dilatometer. When measured by the same methods, the softening point of "Jenaer apparatus glass 20" lies at 626° C. and that of "Jenaer normal-thermometer glass 16 III" at 580° C. The stability to water (total soluble) is determined with the Standard Griess method according to Fischer-Tepohl (1. Glastechnische Berichte 6, 532 (1928)).

The following examples will further illustrate the nature of this invention but the invention is not restricted to these examples. The parts are by weight.

Example 1

(a) A mixture consisting of 16.14 parts of potassium carbonate, 28.22 parts of sodium carbonate (calcined), 23.00 parts of alumina, 15.98 parts of boric acid ($H_3BO_3$) and 62.82 parts of 89 per cent phosphoric acid is fused at from 1200° to 1250° C. A glass having the following composition, in per cent by weight, is obtained: 11 of $K_2O$, 16.5 of $Na_2O$, 23 of $Al_2O_3$, 9 of $B_2O_3$, 40.5 of $P_2O_5$. The softening temperature of 377° C. and the total solubles=66 milligrams±10 per cent.

(b) If 4 parts of boric acid in the glass (a) be replaced by 4 parts of zinc oxide, the softening temperature is lowered to 357° C. and the water-solubility is reduced; total solubles=28 milligrams±10 per cent.

(c) If 2 parts of $K_2O$ in the glass (b) be replaced by 2 parts of $Li_2O$, there is a further lowering of the softening point to 339° C. while the water-solubility only rises a negligible amount; total solubles=40 milligrams±10 per cent.

Example 2

(a) From the mixture: 18.34 parts of potassium carbonate, 25.65 parts of sodium carbonate (calcined), 25.00 parts of alumina, 17.76 parts of boric acid ($H_3BO_3$) and 58.10 parts of 89 per cent phosphoric acid there is prepared by fusion at from 1200° C. to 1250° C. a glass of the following composition in per cent by weight: 12.5 of $K_2O$, 15 of $Na_2O$, 25 of $Al_2O_3$, 10 of $B_2O_3$, 37.5 of $P_2O_5$. The softening point is 387° C. and the total soluble = 98 milligrams ±10 per cent.

(b) If 4 parts of $B_2O_3$ be replaced in the glass (a) by 4 parts of ZnO, in the same way as in Example 1(b), the following values result: softening temperature 370° C., total solubles = 54 milligrams ±10 per cent.

(c) If 2 parts of $Li_2O$ be substituted for a further 2 parts of $B_2O_3$ in the glass (b), a glass is obtained having the following properties: softening temperature 352° C., total solubles = 66 milligrams ± 10 per cent.

What we claim is:

1. Phosphate glass with a low softening point, containing from 34 to 44 per cent of $P_2O_5$, from 20 to 30 per cent of $Al_2O_3$, less than 12 per cent of $B_2O_3$ and at least 25 per cent of alkali, the content of $Na_2O$ amounting to from 8 to 21 per cent and the content of $K_2O$ amounting to from 5 to 21 per cent.

2. Phosphate glass with a low softening point, containing from 34 to 44 per cent of $P_2O_5$, from 20 to 30 per cent of $Al_2O_3$, less than 12 per cent of $B_2O_3$, not more than 3 per cent of $Li_2O$ and a total alkali content of at least 25 per cent, the content of $Na_2O$ amounting to from 8 to 21 per cent and the content of $K_2O$ amounting to from 5 to 21 per cent.

3. Phosphate glass with a low softening point, containing from 34 to 44 per cent of $P_2O_5$, from 20 to 30 per cent of $Al_2O_3$, less than 12 per cent of $B_2O_3$, not more than 5 per cent of BaO and at least 25 per cent of alkali, the content of $Na_2O$ amounting to from 8 to 21 per cent and the content of $K_2O$ amounting to from 5 to 21 per cent.

4. Phosphate glass according to claim 1, in which a part of the $B_2O_3$ is replaced by ZnO in an amount not exceeding 6 per cent of the glass weight.

5. Phosphate glass according to claim 2, in which a part of the $B_2O_3$ is replaced by ZnO in an amount not exceeding 6 per cent of the glass weight.

6. Phosphate glass according to claim 3, in which a part of the $B_2O_3$ is replaced by ZnO in an amount not exceeding 6 per cent of the glass weight.

HANS GRIMM.
JULIUS KNAPP,
*Administrator of Paul Huppert, Deceased.*